United States Patent
Veluswamy et al.

(10) Patent No.: US 11,900,102 B2
(45) Date of Patent: Feb. 13, 2024

(54) DATA STORAGE DEVICE FIRMWARE UPDATES IN COMPOSABLE INFRASTRUCTURE

(71) Applicant: Western Digital Technologies, Inc., San Jose, CA (US)

(72) Inventors: Senthil Kumar Veluswamy, Bangalore (IN); Rahul Gandhi Dhatchinamoorthy, Bangalore (IN); Kumar Ranjan, Bangalore (IN); Lingaraj Bal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 103 days.

(21) Appl. No.: 17/353,068

(22) Filed: Jun. 21, 2021

(65) Prior Publication Data

US 2022/0405090 A1   Dec. 22, 2022

(51) Int. Cl.
*G06F 8/654* (2018.01)

(52) U.S. Cl.
CPC .................................. *G06F 8/654* (2018.02)

(58) Field of Classification Search
None
See application file for complete search history.

(56) References Cited

U.S. PATENT DOCUMENTS

| | | | |
|---|---|---|---|
| 6,279,153 B1 * | 8/2001 | Bi ........................... | H04L 67/04 717/171 |
| 6,745,306 B1 * | 6/2004 | Willman ............. | G06F 12/1491 711/135 |
| 8,214,821 B1 * | 7/2012 | Bartel ..................... | G06F 8/656 717/172 |
| 8,375,385 B1 * | 2/2013 | Harel ..................... | G06F 8/654 717/178 |
| 9,111,621 B2 | 8/2015 | Krutzik et al. | |
| 9,633,738 B1 | 4/2017 | Guo et al. | |
| 9,892,793 B1 * | 2/2018 | Bandic ................ | G11C 11/5628 |
| 10,289,551 B2 * | 5/2019 | Cheng ................. | G06F 11/1438 |
| 10,379,769 B2 * | 8/2019 | Dash ..................... | G06F 3/0611 |
| 2007/0239950 A1 * | 10/2007 | Kern .................... | G06F 11/1464 714/E11.12 |
| 2008/0016300 A1 | 1/2008 | Yim et al. | |
| 2009/0172251 A1 | 7/2009 | Norman | |
| 2011/0058573 A1 * | 3/2011 | Balakavi ................ | H04L 12/66 370/463 |

(Continued)

*Primary Examiner* — Wei Y Zhen
*Assistant Examiner* — Brahim Bourzik
(74) *Attorney, Agent, or Firm* — PATENT LAW WORKS LLP

(57) ABSTRACT

Systems and methods for data storage device firmware updates in a composable infrastructure are described. Recomposition of a system in a composable infrastructure may include downloading a firmware update to a data storage device, activating the firmware update in the data storage device, and receiving a reset command at the data storage device. The reset command may include a step to flush a virtual-to-physical (V2P) mapping table from a volatile memory in the data storage device to non-volatile memory devices in the data storage device. Responsive to a flag that is set and the received reset command, the data storage device may forgo the step of flushing the V2P mapping table.

20 Claims, 5 Drawing Sheets

(56) References Cited

U.S. PATENT DOCUMENTS

| | | | |
|---|---|---|---|
| 2015/0067666 A1* | 3/2015 | Henry | G06F 8/654 |
| | | | 717/168 |
| 2015/0127919 A1 | 5/2015 | Baldwin et al. | |
| 2016/0034206 A1 | 2/2016 | Ryan et al. | |
| 2016/0124740 A1* | 5/2016 | Choi | G06F 8/654 |
| | | | 717/168 |
| 2016/0210132 A1* | 7/2016 | Gerhart | G06F 8/65 |
| 2017/0131948 A1 | 5/2017 | Hoang et al. | |
| 2018/0173421 A1* | 6/2018 | Sela | G06F 21/31 |
| 2019/0121685 A1 | 4/2019 | Coutinho et al. | |
| 2019/0220429 A1* | 7/2019 | Ranjan | G06F 13/128 |
| 2019/0310796 A1* | 10/2019 | Perez | G06F 8/654 |
| 2020/0301606 A1 | 9/2020 | Muthiah | |
| 2021/0064267 A1 | 3/2021 | Hubbard et al. | |
| 2021/0318808 A1 | 10/2021 | Walker et al. | |
| 2021/0357204 A1* | 11/2021 | Nachimuthu | G06F 8/656 |

* cited by examiner

DATA STORAGE DEVICE FIRMWARE UPDATES IN COMPOSABLE INFRASTRUCTURE

TECHNICAL FIELD

The present disclosure generally relates to distributed data storage systems and, more particularly, to firmware updates to data storage devices in composable infrastructure.

BACKGROUND

With the advent of cloud computing, architectures of data centers are evolving to support temporary hosting of applications and operations of software using hardware components that may be reconfigurable into differently configured temporary infrastructures. In order to provide on-demand service, these composable infrastructures need to be quickly decomposed and recomposed. In some configurations, composable infrastructures may reuse conventional processes that may not have been optimized for on-demand configurability. For example, former configurations of infrastructure, and any updates thereto, were performed infrequently and did not require any consideration for optimization.

SUMMARY

Various aspects for reducing the time for composing composable infrastructure of a host device and data storage devices, are described.

One general aspect includes a computer implemented method that includes: downloading a firmware update to a data storage device, wherein the data storage device includes a plurality of non-volatile memory devices; activating the firmware update in the data storage device; receiving a reset command at the data storage device, wherein: the reset command includes flushing a virtual-to-physical (V2P) mapping table from a volatile memory in the data storage device to at least one non-volatile memory of the plurality of non-volatile memory devices in the data storage device; and the V2P mapping table is configured to indicate mapping of physical addresses of the plurality of non-volatile memory devices to virtual addresses available to a host device; and forgoing, responsive to a flag that is set and the received reset command, flushing the V2P mapping table.

Implementations may include one or more of the following features. The method further including setting the flag prior to the downloading of the firmware update. The method further including completing all pending input and output commands in the data storage device prior to the setting the flag. The method further including receiving an input and output fencing command from the host device; and responsive to the input and output fencing command, entering an input and output fencing state prohibiting input and output activity with the plurality of non-volatile memory devices. The method further including completing the reset command at the data storage device. The method further including exiting the input and output fencing state prohibiting input and output activity with the plurality of non-volatile memory devices. The method further including setting the flag after the activating the firmware update. The method further including entering, responsive to the reset command and the setting the flag, an input and output fencing state prohibiting input and output activity with the plurality of non-volatile memory devices. The method further including completing, responsive to entering the input and output fencing state and prior to the forgoing flushing the V2P mapping table, all pending input and output commands in the data storage device prior to the setting the flag. The method further including completing the reset command at the data storage device; and exiting the input and output fencing state prohibiting input and output activity with the plurality of non-volatile memory devices.

Another general aspect includes a data storage system comprising a controller and a data storage device. The controller is configured to: download a firmware update to a data storage device, the data storage device including a plurality of non-volatile memory devices; activate the firmware update in the data storage device; and receive a reset command at the data storage device, where the reset command includes a step to flush a virtual-to-physical (V2P) mapping table from a volatile memory in the data storage device to at least one non-volatile memory device of the plurality of non-volatile memory devices in the data storage device, and the V2P mapping table is configured to indicate mapping of physical addresses of the plurality of non-volatile memory devices to virtual addresses available to a host device. The data storage system configured to forgo, responsive to a flag that is set and the received reset command, the step to flush the V2P mapping table.

Implementations may include one or more of the following features. The data storage system wherein the data storage device is further configured to: set the flag prior to the download of the firmware update. The data storage system where the data storage system is further configured to complete all pending input and output commands in the data storage device prior to the set of the flag. The data storage system where the data storage device is further configured to: receive an input and output fencing command from the host device; and enter an input and output fencing state prohibiting input and output activity with the plurality of non-volatile memory devices. The data storage system where the data storage device is further configured to: complete the reset command at the data storage device. The data storage system where the data storage device is further configured to: receive an input and output unfencing command from the host device; and exit the input and output fencing state prohibiting input and output activity with the plurality of non-volatile memory devices. The data storage system where the data storage device is further configured to: set the flag after activation of the firmware update. The data storage system where the data storage device is further configured to: enter, responsive to the reset command and the set of the flag, an input and output fencing state prohibiting input and output activity with the plurality of non-volatile memory devices. The data storage system where the data storage device is further configured to: complete, responsive to entering the input and output fencing state and prior to the forgoing flushing the V2P mapping table, all pending input and output commands in the data storage device prior to the set of the flag; complete the reset command at the data storage device; and exit the input and output fencing state prohibiting input and output activity with the plurality of non-volatile memory devices.

Still another general aspect includes: a data storage device including a plurality of non-volatile memory devices; means for downloading a firmware update to the data storage device; means for activating the firmware update in the data storage device; means for receiving a reset command at the data storage device, wherein the reset command includes a step to flush a virtual-to-physical (V2P) mapping table from a volatile memory in the data storage device to at least one non-volatile memory device of the plurality of non-volatile memory devices in the data storage device, and the V2P mapping table is configured to indicate mapping of physical addresses of the plurality of non-volatile memory devices to virtual addresses available to a host device; and means for forgoing, responsive to a flag that is set and the received reset command, the step of flushing the V2P mapping table.

It should be understood that language used in the present disclosure has been principally selected for readability and instructional purposes, and not to limit the scope of the subject matter disclosed herein.

DETAILED DESCRIPTION

In the era of cloud computing, the fundamental architecture of data centers is rapidly changing. Further, applications are being hosted at data centers which run on cloud-based services. These hosted applications may include "Platform as a Service (PaaS)", "Infrastructure as a Service (IaaS)" and "Software as a Service (SaaS)". Such hosted applications challenge the fundamentals of data-center architectures in both hardware and software requiring data centers to adapt to keep up with the special requirements of hosted applications including on-demand applications. Since hosted applications may run as on-demand applications, the data centers do not allocate dedicated hardware, but instead, allocate and compose infrastructure (e.g., processors, storage, etc.) as needed. Such an architecture has become known as "composable infrastructure," and is designed for composable and disaggregated infrastructure markets.

The characteristic of composable infrastructure is that resources (e.g., central processing unit (CPU), memory, network or storage) may be composed and decomposed many times as per the application needs. While the hardware may be reused by various applications, a technical problem exists in that the decomposing and recomposing of the hardware may introduce latency, for example, associated with downloading of configuration software, such as firmware, to the infrastructure. As composable infrastructure is often configured on-demand, provisioning these infrastructures may cause delay in the execution of the applications or services provided by the infrastructure. Accordingly, even small reductions in provisioning or configuration time, such as provisioning an infrastructure with executable firmware, may result in significant performance improvement.

As stated, many of the processes for provisioning devices in a data storage system may not have been optimized for composable infrastructure. Accordingly, many provisioning commands or processes may not have been mindful of latency concerns. In the various embodiments described herein, provisioning processes are identified that introduce unnecessary latency in the provisioning process and methods and systems are disclosed for bypassing such processes.

Figure 1A:
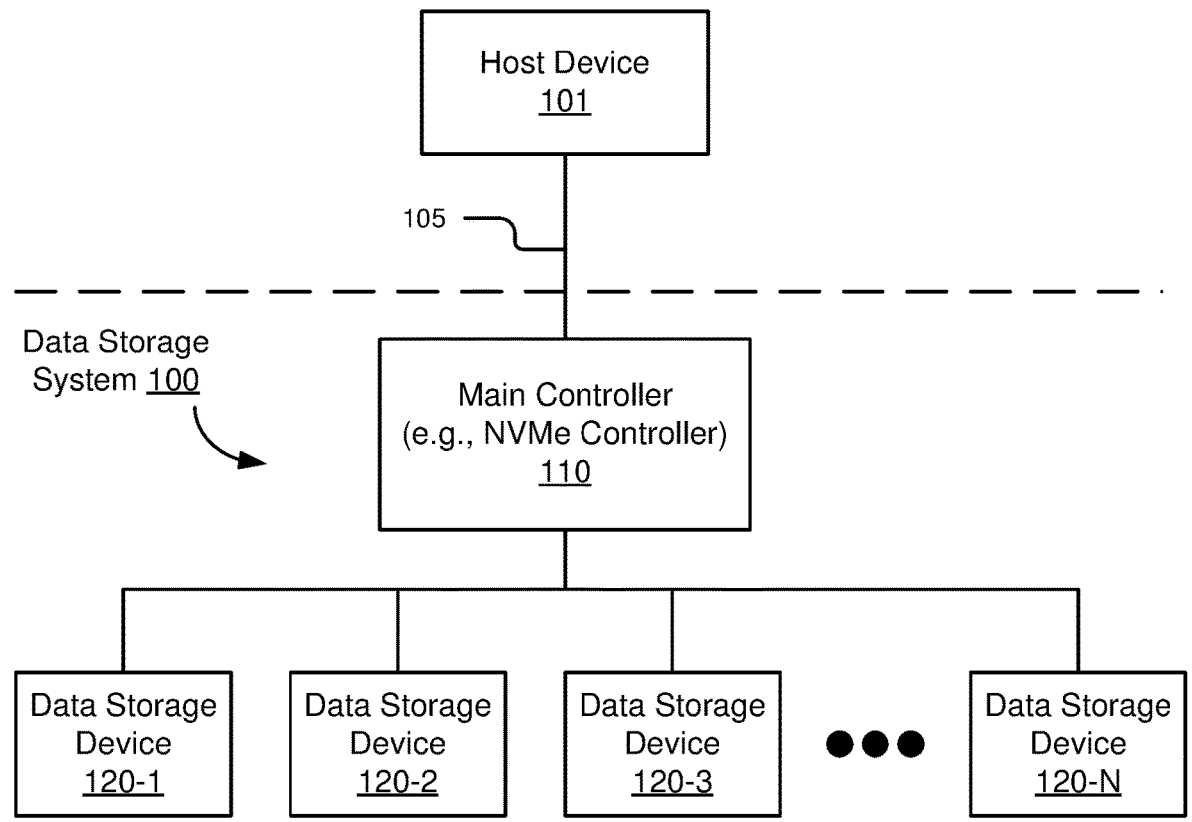
FIG. 1A schematically illustrates a data storage system for storing and retrieving data in data storage devices.
Figure 1B:
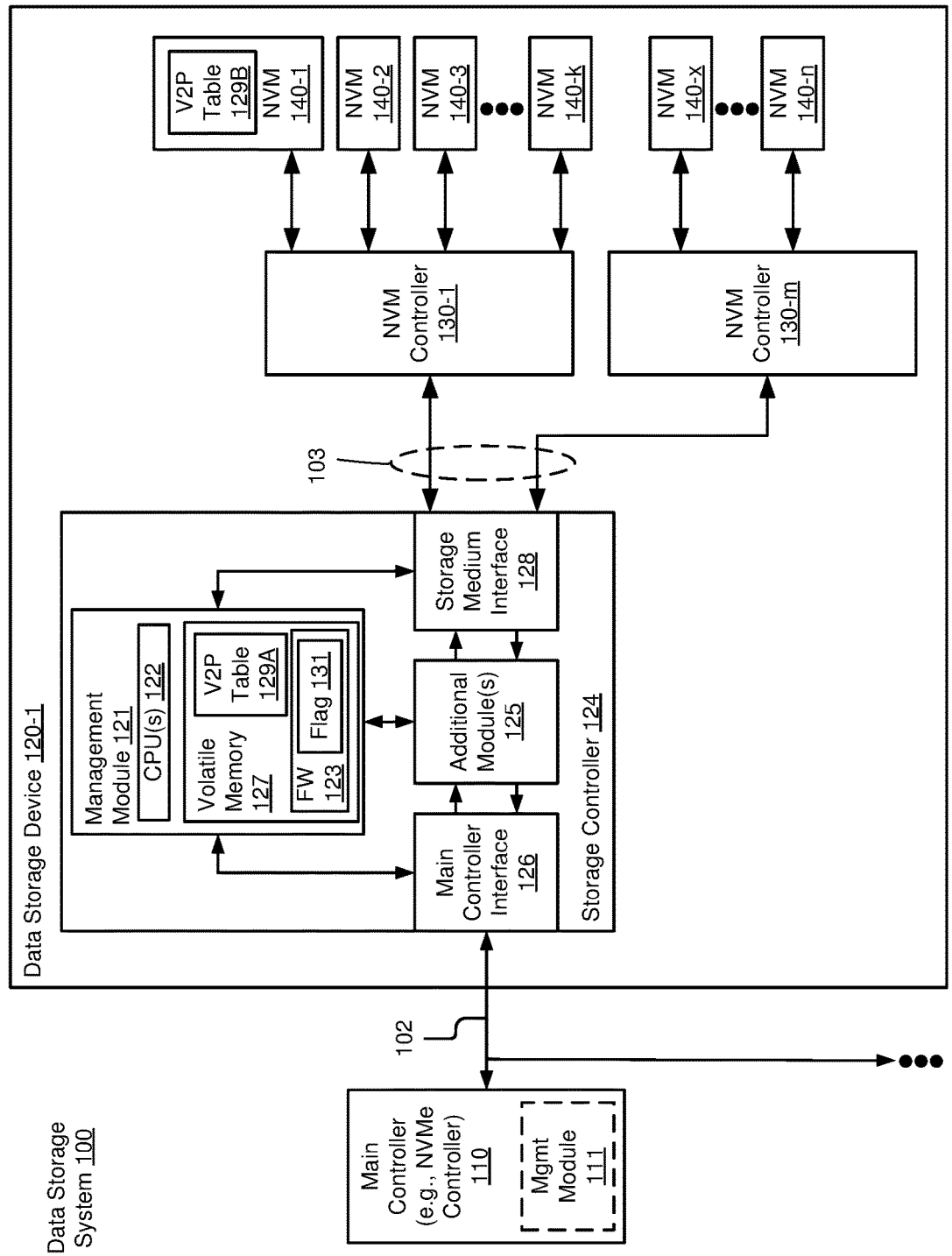
FIG. 1B schematically illustrates a storage device in a data storage system for storing and retrieving data in data storage devices.

FIG. 1A and FIG. 1B are block diagrams illustrating a data storage system 100, in accordance with some embodiments. While some example features are illustrated, various other features have not been illustrated for the sake of brevity and so as not to obscure pertinent aspects disclosed herein. In one implementation, a data storage system 100 includes one or more data storage devices 120 (also sometimes called information storage devices, storage devices, or memory devices). Each data storage device 120 includes a storage controller 124 and non-volatile memory (e.g., one or more NVM device(s) 140 such as one or more flash memory devices), which are used in conjunction with a main controller 110 (e.g., a Non-volatile Memory Express (NVMe) controller). In some embodiments, a storage device includes one or more non-volatile memory (NVM) controllers 130 such as flash controllers or channel controllers (e.g., data storage devices having NVM devices in multiple memory channels), while in other embodiments the NVM devices are controlled by storage controller 124 without intervening NVM controllers 130.

In some embodiments, data storage device 120 includes a single NVM device while in other embodiments, data storage device 120 includes a plurality of NVM devices. In some embodiments, NVM devices 140 include NAND-type flash memory or NOR-type flash memory. Further, in some embodiments, NVM controllers 130, when included in data storage device 120, are solid-state drive (SSD) controllers. In some embodiments, a flash memory device includes one or more flash memory die, one or more flash memory packages, one or more flash memory channels or the like.

Main controller 110 may be coupled to the storage controller 124 through data connections 102. However, in some embodiments, main controller 110 includes storage controller 124, or a portion of storage controller 124, as a component and/or a subsystem. For example, in some embodiments, some or all of the functionality of storage controller 124 may be implemented by software executed on main controller 110. Main controller 110 is sometimes called a controller system, an NVMe controller, garbage collection (GC) leader, or storage virtualization controller. In some embodiments, a storage controller 124 or NVM controller 130 associated with a particular data storage device (e.g., 120-1) acts as a main controller 110 for other data storage devices (e.g., 120-2, 120-3, and 120-N) in data storage system 100. In some embodiments, main controller 110 is a component and/or subsystem of host device 101 (described below).

Main controller interface 126 provides an interface to main controller 110 through data connections 102. Similarly, storage medium interface 128 provides an interface to non-volatile memory (via NVM controllers 130, when included in storage device 120) through connections 103. In some embodiments, storage medium interface 128 includes read and write circuitry, including circuitry capable of providing reading signals to NVM controllers 130 (e.g., reading threshold voltages for NAND-type flash memory) or to NVM device 140 when storage device 120 does not include NVM controllers. In some embodiments, connections 102 and connections 103 are implemented as a communication media over which commands and data are communicated, using a protocol such as NVMe, Double Data Rate 3 (DDR3), Small Computer Systems Interface (SCSI), Serial Advanced Technology Attachment (SATA), Serial Attached SCSI (SAS), or the like.

In some embodiments, host device 101 may be coupled to data storage system 100 through host interface 105. In some embodiments, multiple host devices 101 (only one of which is shown in FIG. 1A) are coupled to data storage system 100 through host interface 105, which may be a storage network interface or other interface capable of supporting communications with multiple host devices 101.

Host device 101, or a respective host in a system having multiple hosts, may be any suitable computer device, such as a computer, a laptop computer, a tablet device, a netbook, an Internet kiosk, a personal digital assistant, a mobile phone, a smart phone, a gaming device, a computer server, or any other computing device. Host device 101 is sometimes called a host system, client, or client system. In some embodiments, host device 101 is a server system, such as a server system in a data center. In some embodiments, the one or more host devices 101 are one or more host devices distinct from the main controller 110 and distinct from the plurality of storage devices 120, but in some other embodiments, the one or more host devices 101 may include one of the data storage devices 120 that has been configured to perform data processing operations and to send data storage commands to access data stored in the one or more data storage devices 120. In some other embodiments, the one or more host devices 101 are configured to store and access data in the plurality of data storage devices 120.

The one or more NVM controllers 130, when included in a respective data storage device 120, are coupled with storage controller 124 through connections 103. Connections 103 are sometimes called data connections, but typically convey commands in addition to data, and optionally convey metadata, error correction information and/or other information in addition to data values to be stored in NVM devices 140 and data values read from NVM devices 140. In some embodiments, however, storage controller 124, the one or more NVM controllers 130, and NVM devices 140 are included in the same device (i.e., an integrated device) as components thereof. Furthermore, in some embodiments, one or more of the data storage devices 120 (e.g., including storage controller 124, the one or more NVM controllers 130, and NVM devices 140) are embedded in a host device (e.g., main controller 110 or host device 101), such as a mobile device, tablet, other computer or computer-controlled device, and the methods described herein are performed, at least in part, by the embedded storage controller. In some embodiments, storage controller 124 is configured to control, and is directly coupled to, one or more NVM devices 140, rendering one or more (or all) of the NVM controllers 130 optional or unnecessary.

In some embodiments, a data storage device 120 includes NVM devices 140 such as flash memory devices (e.g., NVM devices 140-1 through 140-$k$, and NVM devices 140-$x$ through 140-$n$) and NVM controllers 130 (e.g., NVM controllers 130-1 through 130-$m$). Viewed another way, a data storage device 120 includes in memory channels, each of which has an NVM controller 130 and a set of NVM devices 140 coupled to the NVM controller 130, where in is an integer greater than one. However, in some embodiments, two or more memory channels share an NVM controller 130. In either example, each memory channel has its own distinct set of NVM devices 140. In a non-limiting example, the number of memory channels in a typical storage device is 8, 16, or 32. In another non-limiting example, the number of NVM devices 140 per memory channel is typically 8, 16, 32, or 64. Furthermore, in some embodiments, the number of NVM devices 140 is different in different memory channels.

In some embodiments, each NVM controller of NVM controllers 130 includes one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140 are coupled to NVM controllers 130 through connections that typically convey commands in addition to data, and optionally convey metadata, error correction information and/or other information in addition to data values to be stored in NVM devices 140 and data values read from NVM devices 140. NVM devices 140 may include any number (i.e., one or more) of memory devices including, without limitation, non-volatile semiconductor memory devices, such as flash memory device(s).

For example, flash memory device(s) (e.g., NVM devices 140) can be configured for enterprise storage suitable for applications such as cloud computing, for datastore applications, primary and/or secondary storage, or for caching data stored (or to be stored) in secondary storage, such as hard disk drives. Additionally and/or alternatively, flash memory device(s) (e.g., NVM devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, NVM devices 140 are divided into a number of addressable and individually selectable blocks, sometimes called blocks, memory blocks, or erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block.

In some embodiments, storage controller 124 includes a management module 121, a main controller interface 126, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

In some embodiments, management module 121 includes one or more processing units 122 (sometimes herein called CPUs, processors, or hardware processors, and sometimes implemented using microprocessors, microcontrollers, or the like) configured to execute instructions in one or more programs (e.g., in management module 121). In some embodiments, the one or more CPUs 122 are shared by one or more components within, and in some cases, beyond the function of storage controller 124. Management module 121 is coupled to main controller interface 126, additional module(s) 125 and storage medium interface 128 to coordinate the operation of these components. In some embodiments, one or more modules of management module 121 are implemented in management module 111 of main controller 110. In some embodiments, one or more processors (not shown) of main controller 110 are configured to execute instructions in one or more programs (e.g., in management module 111). In some embodiments, management module 111 is coupled to data storage device(s) 120 to manage the operation of data storage device(s) 120.

Storage controller 124 further includes volatile memory 127 which may be used for storing one or more versions of firmware (FW) 123 and a forgo flushing flag 131. The volatile memory 127 may also store mapping information for the NVM devices 140. A data storage device 120, such as a hard disk drive (HDD) or solid state drive (SSD), may maintain a virtual to physical (V2P) mapping table 129 that maps physical block addresses (PBAs) assigned to the actual storage media to virtual block addresses (which may also be referred to as "logical block addresses" or "LBAs"). The data storage device 120 may maintain the V2P mapping table 129 so as to expose more static LBAs for use by an executing application or operating system. From the perspective of the executing application or operating system, the LBA assigned to data does not change (and hence is static). The data storage device 120 may map the LBA to a PBA that changes during operation of the data storage device 120. The data storage device 120 may non-volatilely store a copy (e.g., a V2P mapping table 129B) in the NVM devices 140 for purposes of retention between power cycles. To enable more efficient access (in terms of access times), the data storage device 120 may, however, load or retain a copy (e.g., the V2P mapping table 129A) in the volatile memory 127.

In some embodiments, the main controller 110 may be configured to download firmware 123 to data storage device 120. The firmware 123 enables the storage controller 124 to perform application-specific data storage and retrieval operations with the NVM devices 140. As stated, in composable infrastructure configurations, the data storage systems may be decomposed and recomposed with different functionality. Accordingly, firmware specific to the configuration will be downloaded and stored as application-specific firmware 123 in the data storage device 120.

In some embodiments, the process of updating the firmware may be initiated by host device 101. Communication between the host device 101 and the data storage device 120 may be moderated by main controller 110. The communication may take the form of defined standards such as an NVMe protocol. When updating the firmware, the main controller 110 may engage in at least the steps of "downloading the firmware," "activating or committing the firmware," and "resetting" the storage controller 124 to cause the firmware to execute.

In the NVMe standard, the reset command may be called a Non-volatile Sub-System Reset (NSSR) command. In the NSSR (reset) command, the primary operation is to "flush" the data structures from the volatile memory 127 to the NVM devices 140. This "flushing" or non-volatilely storing the data structures allows the preservation of the data structures between reset operations. In some examples, the V2P mapping table 129A may occupy nearly 50% of the used storage in the volatile memory 127. Accordingly, flushing (e.g., copying) the V2P mapping table 129A to the NVM devices 140, as the V2P mapping table 129B, creates significant latency. Further, since the infrastructure is being decomposed and recomposed, the V2P mapping table will be imminently obsolete. Therefore, forgoing or 'skipping' the flushing of the V2P mapping table 129A provides significant improvement in the overall 'flushing' or updating of firmware from the host device 101.

In some embodiments, the main controller 110 is configured to install a firmware update to a data storage device, where the data storage device includes a plurality of non-volatile memory devices. The main controller 110 is further configured to activate the firmware update in the data storage device 120, and receive a reset command at the data storage device 120. The reset command includes a step to flush the V2P mapping table 129A from the volatile memory 127 in the data storage device 120 to one or more of the plurality of NVM devices 140 in the data storage device 120. As described, the V2P mapping table 129 is indicative of mapping of physical addresses of the plurality of NVM devices 140 to virtual addresses available to the host device 101. Accordingly, the data storage device is configured, in response to a forgo flushing flag 131 that is set and the received reset command, to forgo the step to flush the V2P mapping table 129.

In some embodiments, the data storage device 120 sets a forgo flushing flag 131, based at least in part on the data storage device 120 being decomposed from a composable infrastructure. In some embodiments, the data storage device 120 sets the forgo flushing flag 131 prior to the download of the firmware update. The forgo flushing flag 131, when set, informs the storage controller 124 to forgo the step to flush the V2P mapping table 129A to the NVM devices 140. Data storage device 120 completes all pending inputs and outputs (I/Os) prior to setting the forgo flushing flag 131.

In some embodiments, the data storage device 120 receives an input and output (I/O) fencing command from the host device 101. In response to receiving the I/O fencing command, the data storage device 120 enters an I/O fencing state prohibiting input and output activity with the NVM devices 140. After forgoing the step to flush the V2P mapping table 129, the data storage device 120 completes the reset command at the data storage device 120. The data storage device 120 then receives an I/O unfencing command from the host device 101, and exits the I/O fencing state prohibiting I/O activity with the NVM devices 140.

In other embodiments, the data storage device 120 sets the forgo flushing flag 131 after receiving the activate command for the firmware update. The data storage device 120 may enter an I/O fencing state prohibiting I/O activity with the plurality of NVM devices 140 in response to the reset command and the set of the forgo flushing flag 131. The data storage device 120 completes all pending I/O commands in the data storage device 120 prior to the set of the forgo flushing flag 131 in response to entering the I/O fencing state and prior to the forgoing flushing the V2P mapping table 129A. The data storage device then completes the reset command at the data storage device 120, and exits the I/O fencing state prohibiting I/O activity with the NVM devices 140.

Additional module(s) 125 are coupled to storage medium interface 128, main controller interface 126, and management module 121. In some embodiments, additional module(s) 125 are executed in software by the one or more CPUs 122 of management module 121; in other embodiments, additional module(s) 125 are implemented in whole or in part using special purpose circuitry (e.g., to perform encoding and decoding functions). In some embodiments, additional module(s) 125 are implemented in whole or in part by software executed on main controller 110.

In some embodiments, during a write operation, main controller interface 126 receives data to be stored in NVM devices 140 from the main controller 110. In some embodiments, a read operation may be initiated in response to the main controller 110 sending one or more read commands (e.g., via data connections 102, or alternatively a separate control line or bus) to storage controller 124 requesting data from NVM devices 140. The one or more read commands, sometimes called host read commands, are typically initiated by (and thus received by main controller 110 from) a host device 101, but in some circumstances one or more of the read commands can be initiated by an application or process running on the storage devices 120-1 to 120-N (see FIG. 1A).

Storage controller 124 sends one or more read access commands to NVM devices 140 (e.g., through NVM controllers 130), via storage medium interface 128, to obtain raw read data in accordance with memory locations (addresses) specified by the one or more read commands. The read access commands correspond to the read commands, but the read commands are converted by storage controller 124 into read access commands, for example so as to be directed to one or more specific NVM device 140.

As explained above, a storage medium (e.g., NVM devices 140) is divided into a number of addressable and individually selectable blocks and each block is optionally (but typically) further divided into a plurality of pages and/or word lines and/or sectors. While erasure of data from a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell.

As an example, in response to data being written to a storage medium in pages where the storage medium is erased in blocks, pages in the storage medium may contain invalid (e.g., stale) data, but those pages cannot be overwritten until the whole block containing those pages is erased. To write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Figure 2:
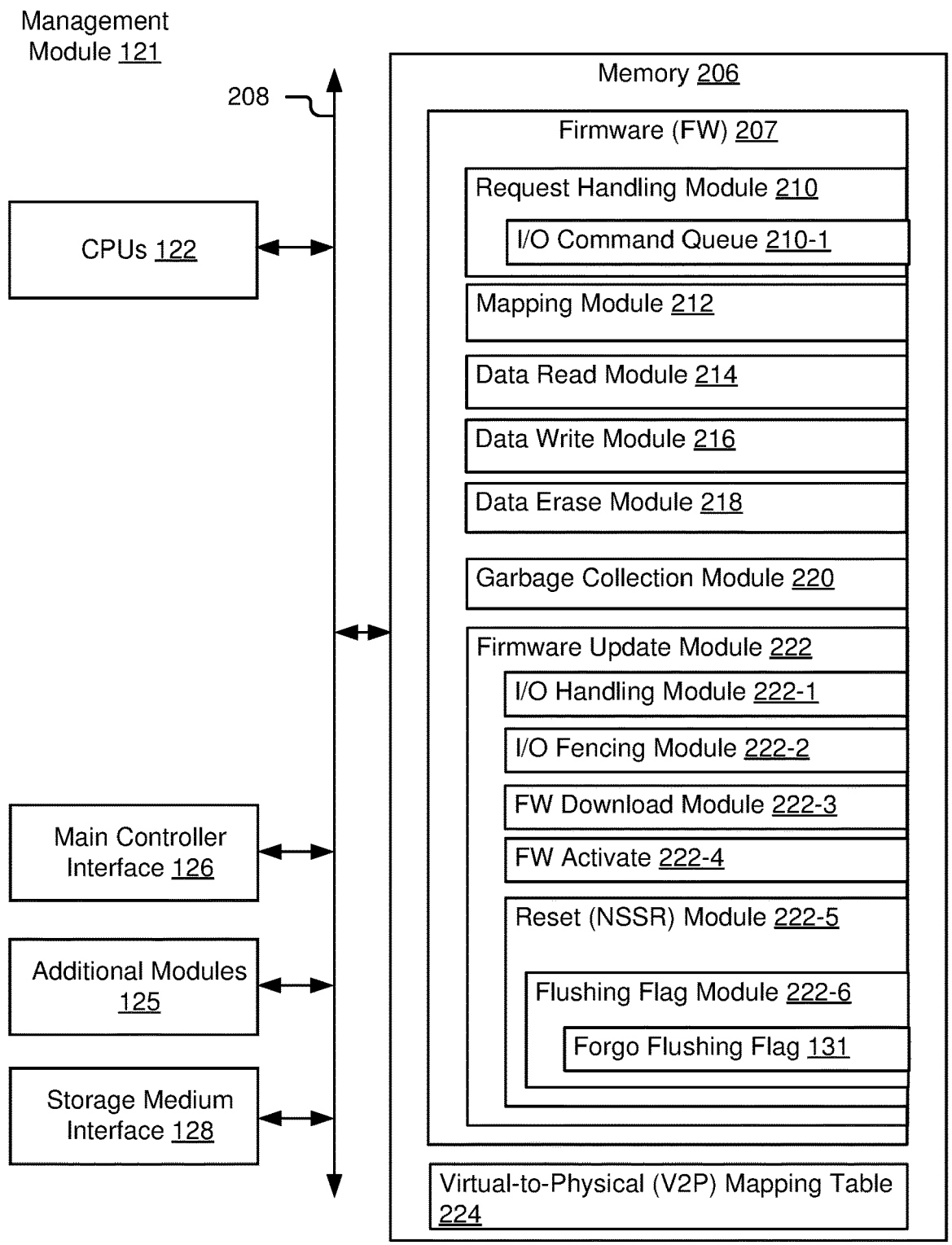
FIG. 2 schematically illustrates implementations of a management module for reducing the time to install a firmware update in a data storage system.

FIG. 2 is a block diagram illustrating a management module 121, in accordance with some embodiments, as shown in FIG. 1B. Management module 121 typically includes one or more processing units 122 (sometimes herein called CPUs, processors, or hardware processors, and sometimes implemented using microprocessors, microcontrollers, or the like) for executing firmware, modules, programs, and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121 is coupled to main controller interface 126, additional module(s) 125, and storage medium interface 128 by the one or more communication buses 208.

Memory 206 includes high-speed random-access memory, such as Dynamic Random Access Memory (DRAM), Static Random Access Memory (SRAM), Double Data Rate (DDR) RAM, or other random-access solid-state memory devices, and may correspond at least in part to volatile memory 127 in FIG. 1B. Memory 206 may include non-volatile memory, such as one or more magnetic disk storage devices, optical disk storage devices, flash memory devices, or other non-volatile solid state storage devices. Memory 206 optionally includes one or more storage devices remotely located from CPU(s) 122. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof.

Request handling module 210 for receiving input/output (I/O) requests from a host device or main controller (e.g., write requests and/or read requests, sometimes called write command and read commands, or host write commands and host read commands). In some embodiments, pending I/O requests that have not yet been processed to the NVM devices may be held in I/O command queue 210-1. For example, as request handling module 210 receives I/O requests, it may add them to I/O command queue 210-1, where they will remain until processed by a corresponding storage operation, such as a read operation through data read module 214, a write operation through data write module 216, or an erase operation through data erase module 218. In some embodiments, the contents of I/O command queue 210-1 may be used to determine whether there are pending I/O commands and to complete all pending I/O commands prior to setting a flag. Similarly, during an I/O fencing state, I/O commands that reach a data storage device may be rejected by request handling module 210 and not added to I/O command queue 210-1.

Mapping module 212 for mapping logical addresses to physical addresses using logical-to-physical mapping table 224. The mapping module 212 may also maintain a defect list (not shown) of bad or damaged non-volatile memory blocks.

Data read module 214 data for reading data, or causing data to be read, from storage device 120 (e.g., NVM devices 140).

Data write module 216 for writing data, or causing data to be written, to storage device 120 (e.g., NVM devices 140).

Data erase module 218 for erasing data, or causing data to be erased, from storage device 120 (e.g., NVM devices 140).

Garbage collection module 220 for performing a garbage collection process on one or more memory portions (i.e., blocks) of storage device 120 (e.g., NVM devices 140).

Firmware update module 222 for reconfiguring the management module 121 with firmware for a recomposed infrastructure in a composable infrastructure system.

I/O handling module 222-1 for completing, responsive to entering the input and output fencing state and prior to the forgoing flushing the V2P mapping table, all pending input and output commands in the data storage device prior to the setting the forgo flushing flag. The I/O handling module also configured for completing all pending input and output commands in the data storage device prior to setting the forgo flushing flag.

I/O fencing module 222-2 for receiving an input and output fencing command from the host device, entering an input and output fencing state prohibiting input and output activity with the non-volatile memory devices, and exiting the input and output fencing state prohibiting input and output activity with the non-volatile memory devices; The I/O fencing module further configured for entering, responsive to the reset command and the setting the forgo flushing flag, an input and output fencing state prohibiting input and output activity with the non-volatile memory devices; The I/O fencing module further configured for exiting the input and output fencing state prohibiting input and output activity with the non-volatile memory devices.

Firmware download module 222-3 for downloading a firmware update to a data storage device, wherein the data storage device includes non-volatile memory devices; The I/O handling module also comprises a means for downloading the firmware update to a data storage device, the data storage device including the non-volatile memory devices.

Firmware activate module 222-4 for activating the firmware update in the data storage device. For example, firmware activate module 222-4 may activate the firmware update by indicating that the downloaded firmware should be executed for operation of the data storage device. In some embodiments, activating the firmware update may include changing an active firmware pointer to the memory location of the downloaded firmware or moving the downloaded firmware into an active firmware memory location.

Reset (NSSR) module 222-5 for receiving a reset command at the data storage device, wherein the reset command includes flushing a virtual-to-physical (V2P) mapping table from a volatile memory in the data storage device to one or more non-volatile memory devices in the data storage device; entering, responsive to the reset command and the setting the forgo flushing flag, an input and output fencing state prohibiting input and output activity with the non-volatile memory devices; The reset module further configured for completing the reset command at the data storage device; The reset module further configured for completing the reset command at the data storage device.

Flushing flag module 222-6 for forgoing, responsive to a forgo flushing flag that is set and the received reset command, flushing the V2P mapping table; The forgo flushing flag module further configured for setting the forgo flushing flag prior to the downloading of the firmware update; The forgo flushing flag module further configured for setting the forgo flushing flag 131 after the activating the firmware update.

Virtual-to-physical mapping table 224 storing a logical-to-physical map (used, for example, by mapping module 212), which maps logical addresses recognized by the host device (e.g., main controller 110 and/or host device 101, FIG. 1A and FIG. 1B) to physical addresses of storage device 120 (e.g., NVM devices 140); The V2P mapping table is configured to indicate mapping of physical addresses of the non-volatile memory devices to virtual addresses available to a host device.

More specifically and in some embodiments, the data storage system may be configured to install the firmware update to a data storage device that include non-volatile memory devices. The data storage system is configured to activate the firmware update to the data storage device, and upon receiving a reset command including a step to flush a virtual-to-physical mapping table from a volatile memory in the data storage device to a non-volatile memory device. However, the data storage device is further configured, in response to a forgo flushing flag being set, to forgo the step to flush the V2P mapping table.

Figure 3:
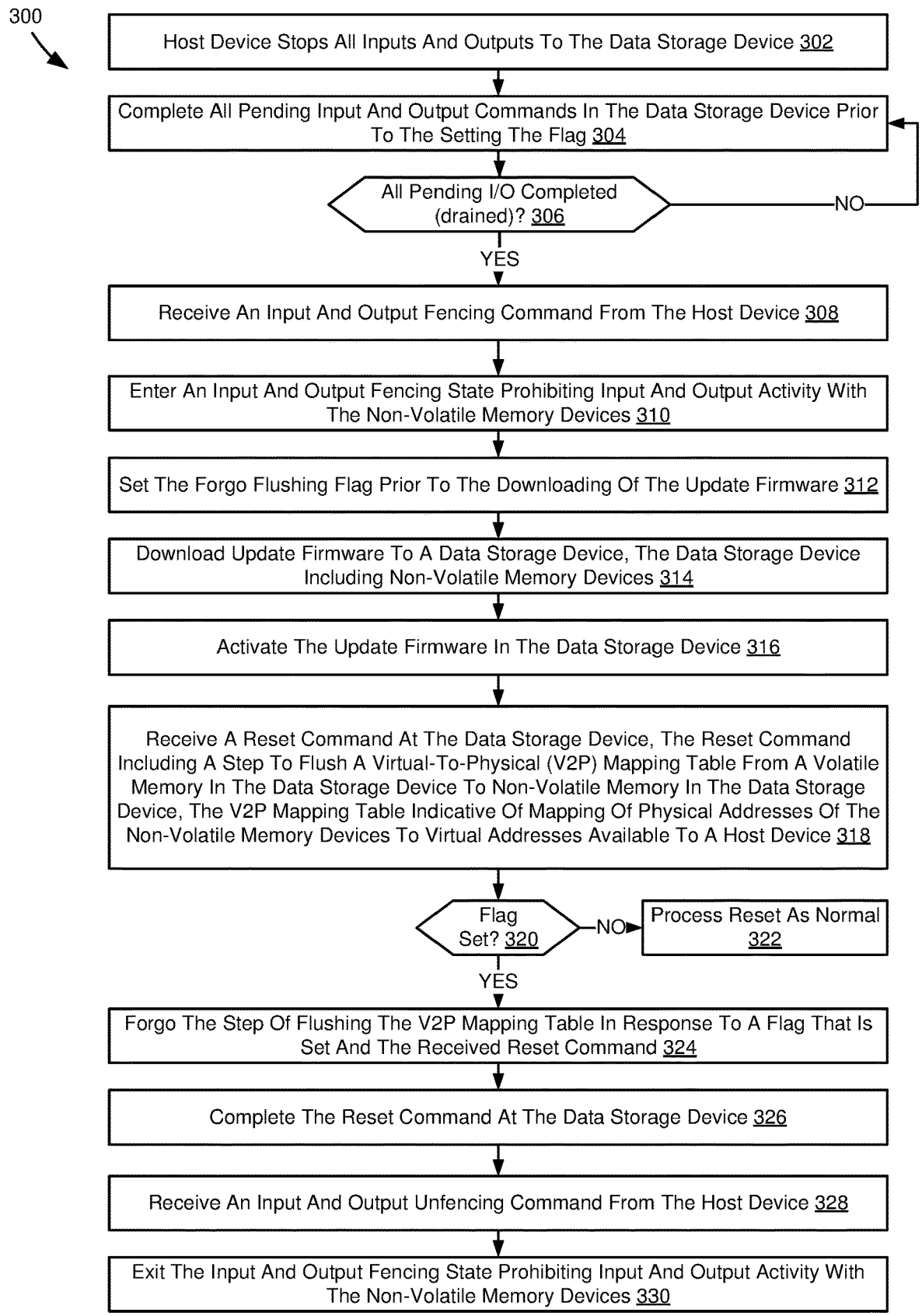
FIG. 3 is a flowchart of an example method of a host device-assisted firmware update method for reducing a firmware update latency.
Figure 4:
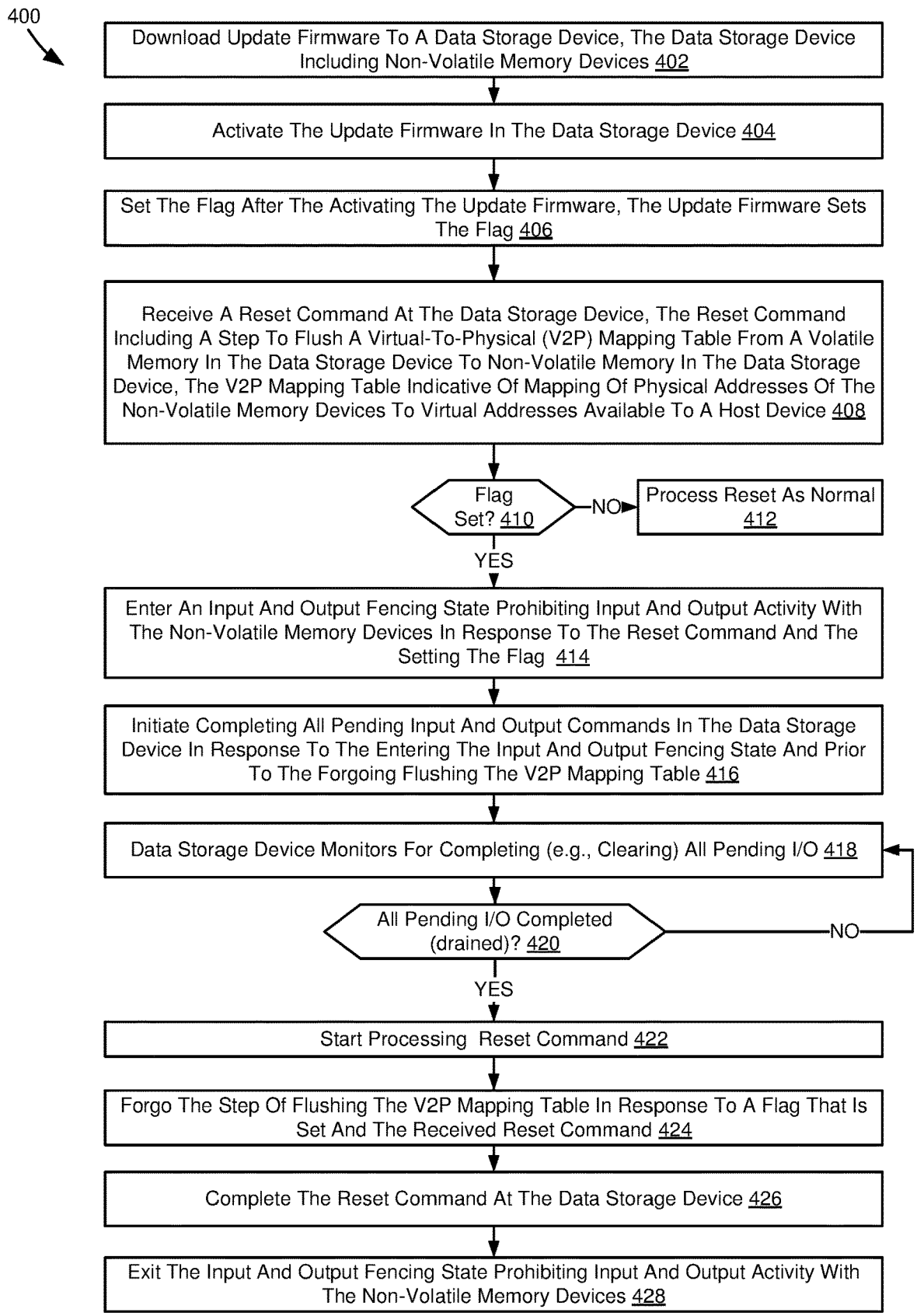
FIG. 4 is a flowchart of an example method of a firmware update method under data storage control for reducing firmware update latency.

FIG. 3 and FIG. 4 illustrate two embodiments for reducing the amount of time for installing a firmware update in composable infrastructure. The embodiment of FIG. 3 illustrates a host-assisted approach for protecting (e.g., fencing) changes to data stored in the NVM devices 140 during an update of the firmware. The embodiment of FIG. 4 illustrates a non-host assisted approach for protecting (e.g., fencing) changes to data stored in the NVM devices 140 during an update of the firmware.

FIG. 3 illustrates a flowchart of a method 300 for reducing the amount of time to install a firmware update in a composable infrastructure in an embodiment that is assisted by a host device.

At block 302, a host device (e.g., host device 101) stops all inputs and outputs (I/Os) to the data storage device. Suspending or stopping I/Os to the data storage device prevents the processing of data commands that could otherwise alter the data structure, including the data storage and data mapping table, into the data storage device.

At a block 304, the data storage device 120 completes all pending input and output commands already resident within the data storage device 120. The pending input and output commands are completed prior to setting a forgo flushing flag 131.

In a query block 306, a determination is made as to whether all pending input and output commands are completed (e.g., drained). If a determination is made that all of the pending I/O commands have not been completed, then processing returns to block 304. If a determination is made that all of the pending I/O commands have been processed, then processing passes to block 308.

In a block 308, an input and output fencing command is received from the host device, and in a block 310, the data storage device 120 enters an input and output fencing state prohibiting input and output activity with the non-volatile memory devices.

In a block 312, a forgo flushing flag is set designating to the data storage device to forgo flushing the V2P mapping table to non-volatile memory devices.

In a block 314, the firmware update is downloaded to the data storage device.

In a block 316, an activation command is received to update the firmware in the data storage device.

In a block 318, a reset command is received at the data storage device. The reset command includes the step to flush the virtual-two-physical mapping table from a volatile memory in the data storage device to non-volatile memory in the data storage device. As stated, the V2P mapping table is indicative of the mapping of physical addresses of the non-volatile memory devices to virtual addresses available to a host device.

In a query block 320, a determination is made as to whether the forgo flushing flag 131 has been set. In response to a determination that no flag has been set, a block 322 processes the reset command in accordance with conventional processing of the reset.

In response to a determination of the forgo flushing flag 131 being set, processing passes to the block 324.

In a block 324, the data storage device forgoes the step of flushing the V2P mapping table in response to the flag being set and the received control command.

In a block 326, the data storage device completes the reset command.

At a block 328, a command to unfence the inputs and outputs at the data storage device is received from the host device.

In a block 330, the data storage device exits the input and output fencing state prohibiting input and output activity with the non-volatile memory devices.

FIG. 4 illustrates a flowchart of a method 400 for reducing the amount of time to install a firmware update in a composable infrastructure in a non-host assisted embodiment.

In a block 402, a firmware update is downloaded to a data storage device. The download may be in response to a recomposition of a composable infrastructure system.

In a block 404, an activate command to update the firmware in the data storage device is received. The activate command may be consistent with NVMe protocol.

In a block 408, the reset command is received at the data storage device. The reset command includes the step to flush the V2P mapping table from the volatile memory to the non-volatile memory in the data storage device. The V2P mapping table maps the non-volatile memory devices to virtual addresses available to the host device.

A query block 410 determines whether the forgo flushing flag is set. If the forgo flushing flag is not set, a block 412 processes the reset in a manner where the V2P mapping table is flushed to the non-volatile memory. If the flag is set, processing passes to a block 414.

In a block 414, the data storage device enters an input and output fencing state prohibiting input and output activity with the non-volatile memory devices. The input and output fencing state is entered in response to the reset command and the forgo flushing flag being set.

In a block 416, the data storage device completes all pending input and output commands in response to entering the input and output fencing state and prior to forgoing flushing the V2P mapping table;

In a block 418, the data storage device monitors for the completion of all pending input and output activity with the data storage device.

In a query block 420, a determination is made regarding the completion of all of the pending inputs and output commands. If all of the pending commands are not completed, then processing returns to block 418. If all of the pending commands have been completed, then processing passes to a block 422.

In a block 422, the received reset command is commenced. The reset command commences the process for preparing the data storage device to receive the firmware update.

In a block 424, the data storage device forgoes the step of flushing the V2P mapping table in response to the forgo flushing flag 131 being set. As described, the flushing of the V2P mapping table consumes a significant portion of time, thereby delaying the recomposition of the composable infrastructure into a subsequent composed system. Further, the V2P mapping table becomes obsolete when the composable infrastructure is decomposed. Therefore, forgoing backing up an obsolete V2P mapping table does not impact system performance or introduce errors into the process.

In a block 426, the data storage system completes the other steps of the reset command.

In a block 428, the data storage system exits the input and output fencing state prohibiting input and output activity with the non-volatile memory devices.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A method, comprising:
   determining a data storage device to decompose and recompose;
   setting, responsive to determining to decompose and recompose the data storage device, a flag indicating that flushing a virtual-to-physical (V2P) mapping table of the data storage device is unnecessary for a next reset command;
   downloading a firmware update to the data storage device, wherein the data storage device includes a plurality of non-volatile memory devices;
   activating the firmware update in the data storage device;
   receiving the next reset command at the data storage device, wherein reset commands normally include flushing the V2P mapping table from a volatile memory in the data storage device to at least one non-volatile memory device of the plurality of non-volatile memory devices in the data storage device;
   determining, prior to executing flushing of the V2P mapping table for the next reset command, whether the flag is set;
   forgoing, responsive to determining that the flag is set and execution of the next reset command, flushing the V2P mapping table to the at least one non-volatile memory device; and
   completing the reset command without flushing the V2P mapping table, wherein:
      the V2P mapping table is cleared from the volatile memory by a power cycle of the reset command; and
      a provisioning time of decomposing and recomposing the data storage device is reduced.

2. The method of claim 1, wherein setting the flag is executed prior to downloading of the firmware update.

3. The method of claim 2, further comprising:
   completing all pending input and output commands in the data storage device prior to setting the flag.

4. The method of claim 3, further comprising:
   receiving an input and output fencing command from a host device; and
   responsive to the input and output fencing command, entering an input and output fencing state prohibiting input and output activity with the plurality of non-volatile memory devices.

5. The method of claim 4, wherein completing the next reset command is responsive to determining whether the flag has been set.

6. The method of claim 5, further comprising:
   exiting the input and output fencing state prohibiting input and output activity with the plurality of non-volatile memory devices.

7. The method of claim 1, wherein setting the flag is executed after activating the firmware update.

8. The method of claim 7, further comprising:
   entering, responsive to receiving the next reset command and setting the flag, an input and output fencing state prohibiting input and output activity with the plurality of non-volatile memory devices.

9. The method of claim 8, further comprising:
   completing, responsive to entering the input and output fencing state and prior to forgoing flushing the V2P mapping table, all pending input and output commands in the data storage device prior to setting the flag.

10. The method of claim 9, further comprising:
   exiting, responsive to completing the next reset command, the input and output fencing state prohibiting input and output activity with the plurality of non-volatile memory devices.

11. A data storage device, comprising:
   a volatile memory;
   a plurality of non-volatile memory devices;
   a processor configured to execute instructions to:
      set, responsive to determining to decompose and recompose the data storage device, a flag indicating that flushing a virtual-to-physical (V2P) mapping table of a data storage device is unnecessary for a next reset command;
      download a firmware update to the data storage device;
      activate the firmware update in the data storage device;
      receive the next reset command, wherein reset commands normally include a step to flush the V2P mapping table from the volatile memory to at least one non-volatile memory device of the plurality of non-volatile memory devices;

determine, prior to executing flushing of the V2P mapping table for the next reset command, whether the flag is set;

forgo, responsive to determining that the flag is set and executing the next reset command, the step to flush the V2P mapping table to the at least one non-volatile memory device; and complete the reset command without flushing the V2P mapping table, wherein:
the V2P mapping table is cleared from the volatile memory by a power cycle of the reset command; and
a provisioning time of decomposing and recomposing the data storage device is reduced.

12. The data storage device of claim 11, wherein the processor is further configured to execute instructions to set the flag prior to downloading the firmware update.

13. The data storage device of claim 12, wherein the processor is further configured to execute instructions to complete all pending input and output commands in the data storage device prior to setting the flag.

14. The data storage device of claim 13, wherein the processor is further configured to execute instructions to:
receive an input and output fencing command from a host device; and
enter an input and output fencing state prohibiting input and output activity with the plurality of non-volatile memory devices.

15. The data storage device of claim 14, wherein the processor is further configured to execute instructions to complete the next reset command responsive to determining whether the flag has been set.

16. The data storage device of claim 15, wherein the processor is further configured to execute instructions to:
receive an input and output unfencing command from the host device; and
exit the input and output fencing state prohibiting input and output activity with the plurality of non-volatile memory devices.

17. The data storage device of claim 11, wherein the processor is further configured to execute instructions to set the flag after activation of the firmware update.

18. The data storage device of claim 17, wherein the processor is further configured to execute instructions to enter, responsive to the next reset command and setting the flag, an input and output fencing state prohibiting input and output activity with the plurality of non-volatile memory devices.

19. The data storage device of claim 18, wherein the processor is further configured to execute instructions to:
complete, responsive to entering the input and output fencing state and prior to forgoing flushing the V2P mapping table, all pending input and output commands in the data storage device prior to the set of the flag; and
exit, responsive to completing the next reset command, the input and output fencing state prohibiting input and output activity with the plurality of non-volatile memory devices.

20. A data storage system, comprising:
a data storage device including:
a volatile memory; and
a plurality of non-volatile memory devices;
means for setting, responsive to determining to decompose and recompose the data storage device, a flag indicating that flushing a virtual-to-physical (V2P) mapping table of the data storage device is unnecessary for a next reset command;
means for downloading a firmware update to the data storage device;
means for activating the firmware update in the data storage device;
means for receiving the next reset command at the data storage device, wherein reset commands normally include a step to flush the V2P mapping table from the volatile memory to at least one non-volatile memory device of the plurality of non-volatile memory devices in the data storage device;
means for determining, prior to executing flushing of the V2P mapping table for the next reset command, whether the flag is set;
means for forgoing, responsive to determining that the flag is set and executing the next reset command, the step of flushing the V2P mapping table; and
means for completing the reset command without flushing the V2P mapping table, wherein:
the V2P mapping table is cleared from the volatile memory by a power cycle of the reset command; and
a provisioning time of decomposing and recomposing the data storage device is reduced.

* * * * *